(12) United States Patent
Kalyankar et al.

(10) Patent No.: US 9,441,119 B2
(45) Date of Patent: Sep. 13, 2016

(54) SOL-GEL TRANSITION CONTROL OF COATINGS BY ADDITION OF SOLIDIFIERS FOR CONFORMAL COATINGS ON TEXTURED GLASS

(75) Inventors: Nikhil D. Kalyankar, Hayward, CA (US); Nitin Kumar, Fremont, CA (US); Zhi-Wen Sun, San Jose, CA (US)

(73) Assignee: Intermolecular, Inc., San Jose, CA (US)

( * ) Notice: Subject to any disclaimer, the term of this patent is extended or adjusted under 35 U.S.C. 154(b) by 1117 days.

(21) Appl. No.: 13/072,860

(22) Filed: Mar. 28, 2011

(65) Prior Publication Data

US 2012/0251718 A1    Oct. 4, 2012

(51) Int. Cl.
| | |
|---|---|
| *C08L 71/02* | (2006.01) |
| *C08L 1/28* | (2006.01) |
| *C08L 83/02* | (2006.01) |
| *C09D 7/12* | (2006.01) |
| *B82Y 30/00* | (2011.01) |
| *C03C 1/00* | (2006.01) |
| *C03C 17/02* | (2006.01) |
| *C23C 18/12* | (2006.01) |
| *C09D 1/00* | (2006.01) |
| *C09D 5/00* | (2006.01) |
| *C08K 5/00* | (2006.01) |
| *C08L 1/02* | (2006.01) |

(52) U.S. Cl.
CPC ............ *C09D 7/1266* (2013.01); *B82Y 30/00* (2013.01); *C03C 1/008* (2013.01); *C03C 17/02* (2013.01); *C09D 1/00* (2013.01); *C09D 7/125* (2013.01); *C23C 18/122* (2013.01); *C23C 18/1245* (2013.01); *C23C 18/1254* (2013.01); *C23C 18/1295* (2013.01); *C03C 2203/30* (2013.01); *C03C 2204/08* (2013.01); *C03C 2218/113* (2013.01); *C08K 5/0008* (2013.01); *C08L 1/02* (2013.01); *C08L 1/284* (2013.01); *C08L 71/02* (2013.01); *C08L 2201/00* (2013.01); *C09D 5/00* (2013.01)

(58) Field of Classification Search
CPC ......... C08L 71/02; C08L 1/284; C08L 83/02
USPC ............................................ 524/22, 43, 612
See application file for complete search history.

(56) References Cited

U.S. PATENT DOCUMENTS

| | | | |
|---|---|---|---|
| 6,465,108 B1 * | 10/2002 | Kamitani et al. | 428/448 |
| 6,908,723 B2 * | 6/2005 | Fardad et al. | 430/270.1 |
| 7,749,606 B2 * | 7/2010 | Inoguchi et al. | 428/446 |
| 7,956,102 B2 * | 6/2011 | Lewis et al. | 523/160 |
| 2004/0052861 A1 * | 3/2004 | Hatcher et al. | 424/602 |
| 2007/0212571 A1 * | 9/2007 | Inoguchi et al. | 428/701 |
| 2009/0036297 A1 * | 2/2009 | Crudden et al. | 502/158 |
| 2009/0036591 A1 * | 2/2009 | Jin et al. | 524/493 |
| 2009/0062460 A1 * | 3/2009 | Nakamura | 524/611 |
| 2012/0225215 A1 * | 9/2012 | Kalyankar | 427/535 |
| 2012/0237676 A1 * | 9/2012 | Kalyankar et al. | 427/243 |

OTHER PUBLICATIONS

Marx et al. (Journal of Sol-Gel Science and Technology, 13, 89-94, 1998).*
Zhao et al. J. Am. Chem. Soc. 1998, 120, 6024-6036.*

* cited by examiner

*Primary Examiner* — Liam J Heincer

(57) ABSTRACT

Embodiments of the invention generally relate to methods and compositions for forming conformal coatings on textured substrates. More specifically, embodiments of the invention generally relate to sol-gel processes and sol-gel compositions for forming low refractive index conformal coatings on textured transparent substrates. In one embodiment a method of forming a conformal coating on a textured glass substrate is provided. The method comprises coating the textured glass substrate with a sol-gel composition comprising a solidifier. It is believed that use of the solidifier expedites the sol-gel transition point of the sol-gel composition leading to more conformal deposition of coatings on textured substrates.

16 Claims, 2 Drawing Sheets

SOL-GEL TRANSITION CONTROL OF COATINGS BY ADDITION OF SOLIDIFIERS FOR CONFORMAL COATINGS ON TEXTURED GLASS

BACKGROUND OF THE INVENTION

1. Field of the Invention

Embodiments of the invention generally relate to methods and compositions for forming conformal coatings on substrates having a textured surface. More specifically, embodiments of the invention generally relate to sol-gel processes and sol-gel compositions for forming low refractive index conformal coatings on textured transparent substrates.

2. Description of the Related Art

Glass that it is highly transmissive to visible light is often highly desirable for many applications including semiconductor device manufacturing, solar cell manufacturing, glass manufacturing, and energy cell manufacturing. One method for increasing the transmission of glass is to pattern or texture the surface of the glass substrate. The transmission of light through the patterned or textured glass may further be enhanced through the use of coatings that provide low reflectivity or a high percent transmission over a broad wavelength range of light.

A conformal coating deposited on a textured glass substrate, meaning that the thickness of the coating conforms to the surface patterns of the textured glass substrate, will achieve greater transmittance than a textured substrate with a non-conformal coating deposited thereon. However, if there is some variation in the conformality of the coating, then maximum transmittance will not be achieved. Therefore in order to achieve maximum transmittance, it is desirable to form conformal coatings on textured glass substrate.

One method of depositing coatings on substrates is through the use of sol-gels. Sol-gel processes are those where a wet formulation (the "sol") is dried to form a gel coating having both liquid and solid characteristics. The sol is mostly liquid based with the components of the sol evenly distributed in the sol system. The gel coating is then treated to form a solid material. The gel coating or the solid material may be formed by applying a thermal treatment to the sol.

However, if after application of the sol to the textured substrate, the sol remains in a low viscosity liquid phase for an extended period of time, the low viscosity sol will flow from the field portions of the textured substrate into the wells of the textured substrate leading to a thicker coating in the wells of the substrate relative to the fields of the substrate which forms a non-conformal coating upon drying. This non-conformal coating is undesirable as it may lead to a decrease in transmittance.

Thus there is a need for coatings and methods for coating textured glass which results in a conformal coating across the textured glass and thus increases the transmission of visible light through glass.

SUMMARY OF THE INVENTION

Embodiments of the invention generally relate to methods and compositions for forming conformal coatings on textured substrates. More specifically, embodiments of the invention generally relate to sol-gel processes and sol-gel compositions for forming low refractive index conformal coatings on textured transparent substrates. In one embodiment a method of forming a conformal coating on a textured glass substrate is provided. The method comprises coating the textured glass substrate with a sol-gel composition comprising a solidifier, drying the sol-gel composition to form a gel on the textured glass substrate, and heating the gel coated textured substrate to form a conformal coating on the textured glass substrate.

In another embodiment, a method of making a sol-gel composition is provided. The method comprises mixing a film forming precursor, an acid or base containing catalyst, water, an alcohol containing solvent, and optionally silicon nanoparticles to form a reaction mixture by at least one of a hydrolysis and polycondensation reaction, and subsequently adding a solidifier to the reaction mixture.

In yet another embodiment, a composition for forming a sol-gel system is provided. The composition comprises a film forming precursor, an acid or base containing catalyst, an alcohol containing solvent, a solidifier, and water.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
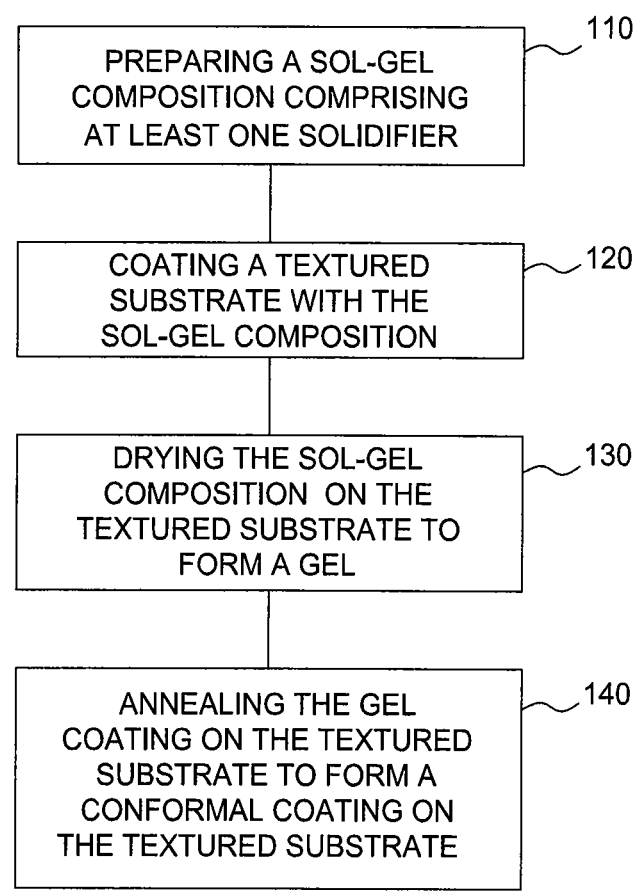
FIG. 1 is a flow chart of one embodiment of a method for forming a conformal coating on a textured substrate according to embodiments described herein.

Embodiments of the invention generally relate to methods and compositions for forming conformal coatings on textured substrates. More specifically, embodiments of the invention generally relate to sol-gel processes and sol-gel compositions for forming low refractive index conformal coatings on textured transparent substrates.

The term "gel" as used herein is a coating that has both liquid and solid characteristics and may exhibit an organized material structure.

The term "molecular porogen" as used herein is any chemical compound capable of forming a sol-gel composition which burns off upon combustion to form a void space or pore in a porous coating.

The term "self assembling molecular porogen" as used herein is a molecular porogen, generally comprising surfactant molecules, which adopts a defined arrangement without guidance or management from an outside source. Assembly is generally directed through noncovalent interactions as well as electromagnetic interactions. One example is the formation of micelles by surfactant molecules above a critical micelle concentration.

The term "sol-gel composition" as used herein is a chemical solution comprising at least a film forming precursor and a solidifier. The film forming precursor forms a polymer which upon annealing forms a conformal coating.

The term "sol-gel process" as used herein is a process where a wet formulation (the "sol") is dried to form a gel coating having both liquid and solid characteristics. The gel coating is then heat treated to form a solid material. The gel coating or the solid material may be formed by applying a thermal treatment to the sol. This technique is valuable for the development of coatings because it is easy to implement and provides films of uniform composition and thickness.

The term "sol-gel transition point" as used herein refers to the transition of a sol to a gel at the gel point. The gel point may be defined as the point at which an infinite polymer network first appears. At the gel point, the sol becomes an Alcogel or wet gel.

The term "solidifier" as used herein refers to any chemical compound that expedites the occurrence of the sol-gel transition point. It is believed that the solidifier increases the viscosity of the sol to form a gel.

The term "surfactant" as used herein is an organic compound that lowers the surface tension of a liquid and contains both hydrophobic groups and hydrophilic groups. Thus the surfactant contains both a water insoluble component and a water soluble component.

The term "textured substrate" as used herein refers to a substrate having features formed on at least one surface of the substrate. The features may form uniform or non-uniform patterns on the at least one surface of the substrate. The features may be formed on the surface of the substrate using, for example, mechanical techniques, bead blasting, chemical etching, and optical techniques.

One method of depositing coatings on substrates is through the use of sol-gels. Sol-gel processes are those where a wet formulation (the "sol") is dried to form a gel coating having both liquid and solid characteristics. The sol is mostly liquid based with the components of the sol evenly distributed in the sol system. The gel coating is then treated to form a solid material. The gel coating or the solid material may be formed by applying a thermal treatment to the sol.

As the sol is dried to form the gel, the sol goes through a sol-gel transition point where the system goes from a low viscosity mostly liquid system to a high viscosity system which is mostly gel. The "sol-gel transition point" may be defined as the transition of a sol to a gel at the gel point. The gel point may be defined as the point at which an infinite polymer network first appears. At the gel point, the sol becomes an Alcogel or wet gel.

Not to be bound by theory but it is believed that expediting the occurrence of the sol-gel transition point will lead to formation of a more conformal coating. It is believed that the longer the sol remains in the low viscosity liquid phase, the more chance that the low viscosity sol will flow from the field portions of the textured substrate into the wells of the textured substrate leading to a thicker coating in the wells of the substrate relative to the fields of the substrate.

According to certain embodiments of the invention, one method for expediting the sol-gel transition point is through the addition of solidifiers to the sol-gel composition. If added at the proper time and in the proper amount, the solidifiers will allow for application of the sol-gel composition as a liquid or sol while expediting the sol-gel transition point to prevent additional flowing of the low viscosity sol into the wells of the textured substrate.

In addition to the solidifier, the sol-gel composition further includes a film forming precursor which forms the primary structure of the gel and the resulting solid coating. Exemplary film forming precursors include silicon containing precursors and titanium based precursors. The sol-gel composition may further include alcohol and water as the solvent system, and either an inorganic or organic acid or base as a catalyst or accelerator. In certain embodiments, where it is desirable to form a porous coating, the sol-gel composition may further include at least one of a porosity forming agent and nanoparticles such as silica nanoparticles. A combination of the aforementioned chemicals leads to a composition called a sol-gel through hydrolysis and condensation reactions. Exemplary coating techniques for applying the sol-gel compositions described herein onto a textured substrate include dip-coating, spin coating, spray coating and curtain coating. The deposited thin films may then be heat treated to remove excess solvent and annealed at an elevated temperature to create a polymerized network (e.g., —Si—O—Si— or Ti—O—Ti) and remove all excess solvent.

In certain embodiments where a porosity forming agent is included in the sol-gel composition reaction products formed by oxidation of the porosity forming agents are removed upon heating leaving behind a porous film with a low refractive index. In certain embodiments, where silica nanoparticles are included in the sol-gel composition, a combination of nanoparticles and the polymerized network may form a porous structure in the conformal coating due to particle packing in presence of the polymerized network that acts as a binder to support and bond the particles together as well as bond the conformal coating to the substrate.

The conformal coatings formed by sol-gel processes on textured substrates described herein were developed using combinatorial methods of optimizing the sol-gel compositions and conditions used to create those coatings. Combinatorial processing may include any processing that varies the processing conditions in two or more substrates or regions of a substrate. The combinatorial methodology includes multiple levels of screening to select the coatings for further variation and optimization. Exemplary combinatorial methods and apparatus are described in co-pending U.S. patent application Ser. No. 12/970,638, filed Dec. 16, 2010 and titled HIGH-THROUGHPUT COMBINATORIAL DIP-COATING APPARATUS AND METHODOLOGIES.

FIG. 1 is a flow chart of one embodiment of a method 100 for forming a conformal coating on a textured substrate according to embodiments described herein. The conformal coating may be a conformal oxide coating. Exemplary conformal oxide coatings include conformal silicon oxide ($Si_xO_y$) coatings or conformal titanium oxide ($Ti_xO_y$) coatings. At block 110, a sol-gel composition comprising at least one solidifier is prepared.

In one embodiment, the sol-gel composition may be prepared by mixing a film forming precursor, an acid or base containing catalyst, and a solvent system containing alcohol and water to form a reaction mixture by at least one of a hydrolysis and polycondensation reaction. The reaction mixture may be stirred at room temperature or at an elevated temperature (e.g., 50-60 degrees Celsius) until the reaction mixture is substantially in equilibrium (e.g., for a period of 24 hours). The reaction mixture may then be cooled and additional solvent added to reduce the ash content if desired.

In certain embodiments, the solidifier may be added to the reaction mixture prior to stirring the reaction mixture. However, it is generally preferable to add the solidifier to the reaction mixture as close to application of the sol-gel composition to the textured substrate as possible so as to avoid premature gelation or solidification of the of the sol-gel composition prior to or during application.

The solidifier may be selected from the group comprising: gelatin, polymers, silica gel, emulsifiers, organometallic complexes, charge neutralizers, cellulose derivatives, and combinations thereof.

Gelatin is generally a translucent, colorless, brittle solid derived from the hydrolysis of collagen by boiling skin, ligaments and tendons. Exemplary gelatins are commercially available from SIGMA-ALDRICH®.

The polymers may be selected from the group comprising: sodium acrylate, sodium acryloyldimethyl taurate, isohexadecane, polyoxyethylene (80) sorbitan monooleate (commercially available under the tradename TWEEN® 80 from ICI Americas Inc.), polyoxyethylene (20) sorbitan monostearate (commercially available under the tradename TWEEN® 60 from ICI Americas Inc.), laureth-7, C13-14 Isoparaffin, hydroxyethyl acrylate, polyacrylamide, polyvinyl butyral (PVB), squalane, polyalkylene glycols, and combinations thereof. Exemplary polymers are available under the tradenames SIMULGEL® 600, SIMULGEL® EG, SEPIGEL® 305, SIMULGEL® NS, CAPIGEL™ 98, SEPIPLUS™ 265 and SEPIPLUS™ 400 all of which are commercially available from SEPPIC.

Exemplary polyalkylene glycols include polyalkylene glycols where the alkyl group may be any alkyl group, such as, methyl, ethyl, propyl, butyl, pentyl, hexyl, heptyl, octyl, nonyl, decyl, etc. One exemplary polyalkylene glycol includes polyethylene glycol (PEG). Preferable polyethylene glycols have a molecular mass between 200 and 1,000.

Silica gel is a granular, viscous, highly porous form of silica made synthetically from sodium silicate. Exemplary silica gels are commercially available from SIGMA-ALDRICH®.

Exemplary organometallic complexes may comprise a hydrophilic sugar-like head portion and a lipophilic hydrocarbon tail couple by an organometallic fragment (e.g., pentacarbonyl [D-gluco-hex (N-n-octylamino)-1-ylidene] chromium). Other exemplary organometallic complexes include low-molecular mass organic gelator (LMOG).

Exemplary charge neutralizers include ammonium nitrate.

Exemplary cellulose derivatives include hydroxypropyl cellulose (HPC), hydroxypropyl methylcellulose (HPMC), nitrocellulose, hydroxypropyl ethylcellulose, hydroxypropyl butylcellulose, hydroxypropyl pentylcellulose, methyl cellulose, ethylcellulose, hydroxyethyl cellulose, various alkyl celluloses and hydroxyalkyl celluloses, various cellulose ethers, cellulose acetate, carboxymethyl cellulose, sodium carboxymethyl cellulose, calcium carboxymethyl cellulose, among others. Exemplary cellulose derivatives are commercially available under the tradenames KLUCEL® hydroxypropylcellulose, METHOCEL™ cellulose ethers, and ETHOCEL™ ethylcellulose polymers.

The at least one solidifier may be added in an amount sufficient to expedite the sol-gel transition point without solidifying the sol prior to application to the textured substrate. The at least one solidifier may be added in an amount such that the sol-gel transition occurs when the sol-gel composition comprises less than 50% solid by weight. The at least one solidifier may be added in an amount such that the sol-gel transition occurs when the sol-gel composition comprises less than 40% solid by weight. The at least one solidifier may be added in an amount such that the sol-gel transition occurs when the sol-gel composition comprises less than 30% solid by weight. The at least one solidifier may be added in an amount such that the sol-gel transition occurs when the sol-gel composition comprises less than 20% solid by weight. The at least one solidifier may be added in an amount such that the sol-gel transition occurs when the sol-gel composition comprises less than 10% solid by weight.

The at least one solidifier may comprise at least 0.0001 wt. %, 0.001 wt. %, 0.01 wt. %, 0.1 wt. % or 1 wt. % of the total sol-gel composition. The at least one solidifier may comprise up to 0.01 wt. %, 0.1 wt. %, 1 wt. % or 5 wt. % of the total sol-gel composition. In certain embodiments, the at least one solidifier may comprise between 0.001 wt. % and 1 wt/% of the total sol-gel composition. It should be understood that the amount of solidifier added to the sol-gel composition may be based on factors including molecular weight, reactivity, and the number of reactive sites per molecule all of which may vary from molecule to molecule. It is preferable to lower the percent solids at the sol-gel transition point; while at the same time assuring that the solidifier doesn't induce gelation prior to coating in the liquid phase itself.

The sol-gel composition further includes a film forming precursor which forms the primary structure or network of the gel and the resulting solid coating. The film forming precursor may be a silicon containing precursor or a titanium containing precursor. Exemplary silicon containing precursors include silane and silicon alkoxide containing precursors. The silicon containing precursor may be in liquid form. Exemplary silicon containing precursors include alkyl containing silicon precursors such as tetraalkylorthosilicate, alkyltrialkoxysilane, alkyltrialkylsilane (where each alkyl group may independently be any alkyl group, such as methyl, ethyl, propyl, butyl, pentyl, hexyl, heptyl, octyl, nonyl, decyl, etc.). Exemplary silane containing precursors or metal alkoxide containing precursors may be selected from the group comprising: tetraethylorthosilicate (TEOS), 3-glycidoxypropyltrimethoxysilane (Glymo), octadecyltrimethoxysilane (OTS), propyltriethoxysilane (PTES), methyltriethoxysilane (MTES), (heptadecafluoro)1,1,2,2-tetrahydrodecyltrimethoxysilane, hexamethyldisilazane (HMDS), and combinations thereof. Exemplary titanium precursors include titanium alkoxide and titanium chloride precursors.

The amount of film forming precursor may comprise at least 1 wt. %, 3 wt. %, 5 wt. %, 7 wt. %, 9 wt. %, 10 wt. %, 11 wt. %, 13 wt. %, 15 wt. %, 17 wt. %, or 19 wt. % of the total weight of the sol-gel composition. The amount of film forming precursor may comprise up to 3 wt. %, 5 wt. %, 7 wt. %, 9 wt. %, 10 wt. %, 11 wt. ° A., 13 wt. %, 15 wt. %, 17 wt. %, 19 wt. %, or 20 wt. % of the total weight of the sol-gel composition. The film forming precursor may be present in the sol-gel composition in an amount between about 1 wt. % and about 20 wt. % of the total weight of the sol-gel composition. The amount of film forming precursor may correspond to 1-5% final ash content in the final sol composition.

The sol-gel composition further includes an acid or base catalyst for controlling the rates of hydrolysis and condensation. The acid or base catalyst may be an inorganic or organic acid or base catalyst. Exemplary acid catalysts may be selected from the group comprising hydrochloric acid (HCl), nitric acid ($HNO_3$), sulfuric acid ($H_2SO_4$), acetic acid ($CH_3COOH$) and combinations thereof. Exemplary base catalysts include tetramethylammonium hydroxide (TMAH).

The acid catalyst level may be 0.001 to 10 times stoichiometric molar precursor (the film forming precursor).

The acid catalyst level may be from 0.001 to 0.1 times molar precursor (the film forming precursor). The base catalyst level may be 0.001 to 10 times stoichiometric molar precursor (the film forming precursor). The base catalyst level may be from 0.001 to 0.1 times molar precursor (the film forming precursor). The amount of film acid catalyst level may be from 0.001 to 0.1 wt. % of the total weight of the sol-gel composition. The amount of base catalyst level may be from 0.001 to 0.1 wt. % of the total weight of the sol-gel composition.

The sol-gel composition further includes a solvent system. The solvent system may include a non-polar solvent, a polar aprotic solvent, a polar protic solvent, and combinations thereof. Selection of the solvent system may be used to influence the timing of the sol-gel transition. Exemplary solvents include alcohols, for example, n-butanol, isopropanol, n-propanol (NPA), ethanol, methanol, and other well known alcohols. The amount of solvent may be from 80 to 95 wt. % of the total weight of the sol-gel composition. The solvent system may further include water. The amount of water may be from 0.001 to 0.1 wt. % of the total weight of the sol-gel composition. In certain embodiments, water may be present in 0.5 to 10 times the stoichiometric amount need to hydrolyze the silicon containing precursor molecules.

In certain embodiments where a porous conformal coating is desired, the sol-gel composition may further include a porosity forming agent. The porosity forming agent may include a molecular porogen. The molecular porogen may be a self assembling molecular porogen. The self assembling molecular porogen may be a surfactant selected from the group comprising: non-ionic surfactants, cationic surfactants, anionic surfactants, and combinations thereof. Exemplary non-ionic surfactants include non-ionic surfactants with linear hydrocarbon chains and non-ionic surfactants with hydrophobic trisiloxane groups. The self assembling molecular porogen may be a trisiloxane surfactant. Exemplary self assembling molecular porogens may be selected from the group comprising: polyoxyethylene stearyl ether, benzoalkoniumchloride (BAC), cetyltrimethylammoniumbromide (CTAB), 3-glycidoxypropyltrimethoxysilane (Glymo), polyethyleneglycol (PEG), ammonium lauryl sulfate (ALS), dodecyltrimethylammoniumchloride (DTAC), polyalkyleneoxide modified hepta-methyltrisiloxane, and combinations thereof.

Exemplary self assembling molecular porogens are commercially available from Momentive Performance Materials under the tradename SILWET® surfactant and from SIGMA ALDRICH® under the tradename BRIJ® surfactant. Suitable commercially available products of that type include SILWET® L-77 surfactant and BRIJ® 78 surfactant.

The self assembling molecular porogen may comprise at least 0.1 wt. %, 0.5 wt. %, 1 wt. %, or 3 wt. % of the total weight of the sol-gel composition. The self assembling molecular porogen may comprise at least 0.5 wt. %, 1 wt. %, 3 wt. % or 5 wt. % of the total weight of the sol-gel composition. The self assembling molecular porogen may be present in the sol-gel composition in an amount between about 0.1 wt. % and about 5 wt. % of the total weight of the sol-gel composition.

In certain embodiments where a porous conformal coating is desired, the sol-gel composition may further include silica nanoparticles. The nanoparticles may be of various shapes and sizes. Exemplary shapes include spherical, cylindrical, prolate spheroid, and disc shaped. The size of the nanoparticles may vary from 5 nanometers to 100 nanometers in diameter. Exemplary silica nanoparticles are commercially available in sol form under the tradename ORGANOSILICASOL™ from Nissan Chemical America Corporation. Suitable commercially available products of that type include ORGANOSILICASOL™ DMAC-ST, ORGANOSILICASOL™ EG-ST, ORGANOSILICASOL™ IPA-ST, I ORGANOSILICASOL™ PA-ST-L, ORGANOSILICASOL™ IPA-ST-MS, ORGANOSILICASOL™ IPA-ST-ZL, ORGANOSILICASOL™ MA-ST-M, ORGANOSILICASOL™ MEK-ST, ORGANOSILICASOL™ MEK-ST-MS, ORGANOSILICASOL™ MEK-ST-UP, ORGANOSILICASOL™ MIBK-ST and ORGANOSILICASOL™ MT-ST.

In certain embodiments, the silica nanoparticles may be generated in-situ. One exemplary sol-gel composition for in-situ generation of silica nanoparticles includes a silane precursor (e.g., TEOS), water, a base catalyst (e.g., TMAH), and an alcohol solvent (e.g. n-propyl alcohol (NPA)). The components may be mixed for twenty-four hours at room or elevated (~60 C) temperatures as discussed above.

In certain embodiments where a porous coating is desired, the sol-gel composition may further include both silica nanoparticles and porosity forming agents to create a binary distribution of pores. The binary distribution of pores may comprise a first set of pores formed by combustion of the porosity forming agent nanostructures in the polymeric network or matrix (e.g. the Si—O—Si network) and a second set of pores formed by the voids in particle packing in the polymeric network or matrix.

At block 120, a textured substrate is coated with the sol-gel composition. The textured substrate is textured on at least one surface. The at least one textured surface of the textured glass substrate may have a surface roughness from about 0.1 μm to about 1.5 μm. Exemplary substrates include glass, silicon, metallic coated materials, or plastics. Exemplary glass substrates include high transmission low iron glass, borosilicate glass (BSG), sodalime glass and standard clear glass. The sol-gel composition may be coated on the substrate using, for example, dip-coating, spin coating, curtain coating, or a spray coating process. Other application methods known to those skilled in the art may also be used. The textured substrate may be coated on a single side or on multiple sides of the substrate.

At block 130, the coating on the substrate is dried to form a gel. During the drying, the solvent of the sol-gel composition is evaporated and further bonds between the components, or precursor molecules, may be formed. The drying may be performed by exposing the coating on the substrate to the atmosphere at room temperature. The coatings (and/or the substrates) may alternatively be exposed to at least one of a heated environment, low pressure, and air flow. The drying of the coatings may not require elevated temperatures, but may vary depending on the composition of the sol-gel compositions used to form the coatings. In one embodiment, the drying temperature may be in the range of approximately 25 degrees Celsius to approximately 200 degrees Celsius. In one embodiment, the drying temperature may be in the range of approximately 50 degrees Celsius to approximately 60 degrees Celsius. Drying temperature is dependent on the boiling point of the solvent used during sol formation.

At block 140, the gel coating on the annealed substrate is annealed to form a conformal coating on the textured substrate. The annealing temperature may be selected based on the chemical composition of the sol-gel compositions, depending on what temperatures may be required to form cross-linking between the components throughout the coating. In one embodiment the annealing temperature may be in the range of 500 degrees Celsius and 1,000 degrees Celsius. In another embodiment the annealing temperature may be 600 degrees Celsius or greater. In yet another embodiment the annealing temperature may be between 625 degrees Celsius and 650 degrees Celsius. In certain embodiments where the sol-gel includes a porosity forming agent, the anneal process removes the porosity forming agent from the gel to form a porous coating.

The conformal coating layer in one embodiment may have a thickness greater than 50 nanometers. The conformal coating layer in another embodiment may have a thickness between about 50 nanometers and about 1,000 nanometers. The conformal coating layer in yet another embodiment may have a thickness between about 100 nanometers and about 200 nanometers. The conformal coating layer in still yet another embodiment may have a thickness of about 150 nanometers.

In one embodiment, the coating may be a single conformal coating. In alternate embodiments, the conformal coating may be formed of multiple conformal coatings on the same substrate. In such an embodiment, the conformal coating, gel-formation, and annealing may be repeated to form a multi-layered conformal coating with any number of layers. In certain embodiments, where porous conformal coatings are formed, the multi-layers may form a coating with graded porosity. For example, in certain embodiments it may be desirable to have a conformal coating which has a higher porosity adjacent to air and a lower porosity adjacent to the substrate surface. A graded coating may be achieved by modifying various parameters, such as, the type of porosity forming agent, the anneal time, multi-step application of the coating, and the anneal temperature.

In certain embodiments where porous conformal coatings are formed, it may be desirable to expose the porous coatings to one or more post-treatment processes. In one embodiment, the porous conformal coatings may be exposed to a silane-based solution to impart hydrophobic properties to the film leading to reduced moisture content. The silane-based solution may include a solvent and a silane. Exemplary solvents include ethanol, propanol, butanol chloroform, and dimethylformamide (DMF). Exemplary silanes include silanes selected from the group comprising propyltriethoxysilane (PTES), octadecyltrimethoxysilane (OTS), (heptadecafluoro)-1,1,2,2—tetrahydrodecyltrimethoxysilane, hexamethyldisilazane (HMDS), and combinations thereof. The concentration of the silane could be from 1 micromolar to 10 milimolar in one of the aforementioned solvents. In another embodiment, the porous silicon oxide coating may be exposed to plasma to seal the top layer of the pores to make the film more moisture resistant while preserving the optical properties of the film. The plasma may be RF or DC plasma. In certain embodiments, the pores may be sealed using a molecular masking layer. One exemplary masking layer includes a polymeric layer which may be a few nanometers thick and doesn't significantly impact the overall refractive index of the film. Another exemplary masking layer could be a vacuum deposited metal oxide layer of 2-5 nanometers thickness such as $TiO_2$.

EXAMPLES

Objects and advantages of the embodiments described herein are further illustrated by the following examples. The particular materials and amounts thereof, as well as other conditions and details, recited in these examples should not be used to limit embodiments described herein. Unless stated otherwise all percentages, parts and ratios are by weight. Examples of the invention are numbered while comparative samples, which are not examples of the invention, are designated alphabetically.

Example #1

Tetraethylorthosilicate (TEOS) corresponding to 3% total ash content (based on equivalent weight of $SiO_2$ produced) in the final composition was mixed with water (2 times stoichiometric amount based on TEOS), nitric acid (0.02 times the molar TEOS amount) and n-propanol (10-100 times molar TEOS). The solution was stirred for 24 hours at room temperature or elevated temperature (50-60 degrees Celsius). The solution was cooled to room temperature and mixed with an additional amount of n-propanol to bring the total ash content of the solution to ~3%. TWEEN® 80 emulsifier was added to this solution at 0.001 wt. % to act as a solidifier. The solution was either dip (coating speed ~10 mm/sec) or spin coated (1,000-1,400 rpm) on pre-cleaned borosilicate (BSG) or sodalime glass to achieve a film thickness of around ~150 nm after annealing. The glass substrate was then dried at 150 degrees Celsius for 30 minutes in an oven to evaporate all the solvent and then annealed at 625-650 degrees Celsius for 6 minutes. The glass substrate was cooled on a steel slab and characterized to determine the conformality of the film, refractive index (RI) and improvement in transmittance of light.

Example #2

The coating of Example #2 was prepared similar to the coating of Example #1 except a self assembling molecular porogen, SILWET® L-77 surfactant, was added to the composition at 3% mass level to act as a porogen. After the anneal process a conformal porous silicon oxide film was formed.

Example #3

The coating of Example #3 was prepared similar to the coating of Example #1 except silica nanoparticles were added with ash percent contribution levels from 10 to 70%; the remaining ash content coming from Tetraethylorthosilicate to form a total of 3% ash content in the sol composition.

Figure 2:
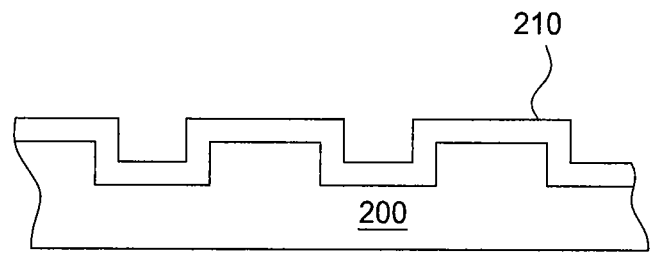
FIG. 2 is a schematic diagram illustrating one embodiment of a conformal coating on a textured glass substrate according to embodiments described herein.

FIG. 2 is a schematic diagram illustrating one embodiment of a conformal coating 210 on a textured glass substrate 200 according to embodiments described herein. The conformal coating 210 was produced using sol-gel compositions comprising the solidifier and methods as described herein.

Figure 3:
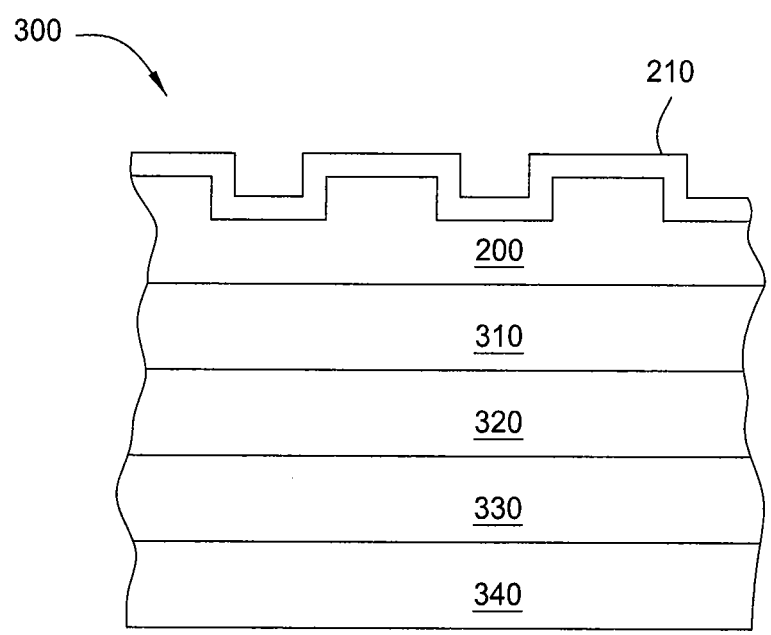
FIG. 3 is a schematic diagram illustrating one embodiment of a photovoltaic cell comprising a conformal coating formed on a textured glass substrate according to embodiments described herein.

FIG. 3 is a schematic diagram illustrating one embodiment of a photovoltaic cell 300 comprising a conformal coating 210 formed on a textured glass substrate 200 according to embodiments described herein. The photovoltaic cell 300 comprises the glass substrate 200 and the porous antireflective coating as shown in FIG. 2. In this example embodiment, the incoming or incident light from the sun or the like is first incident on the conformal coating 210, passes therethrough and then through the glass substrate 200 and front transparent conductive electrode before reaching the photovoltaic semiconductor (active film) 320 of the solar cell. The photovoltaic cell 300 may also include, but does not require, a reflection enhancement oxide and/or EVA film 330, and/or a back metallic or otherwise conductive contact and/or reflector 340 as shown in FIG. 3. Other types of photovoltaic devices may of course be used, and the photovoltaic device 300 is merely exemplary. As explained above, the conformal coating 210 may reduce reflections of the incident light and permits more light to reach the thin film semiconductor film 320 of the photovoltaic device 300 thereby permitting the device to act more efficiently.

Embodiments described herein have provided improved conformal coatings which exhibit increased conformality. It has been found by the inventors that expediting the occurrence of the sol-gel transition point leads to formation of a more conformal coating. It is believed that the longer the sol remains in the low viscosity liquid phase, the more chance that the low viscosity sol will flow from the field portions of the textured substrate into the wells of the textured substrate leading to a thicker coating in the wells of the substrate relative to the fields of the substrate.

While the foregoing is directed to embodiments of the invention, other and further embodiments of the invention may be devised without departing from the basic scope thereof.

What is claimed is:

1. A method of making a sol-gel composition, comprising:
   mixing a film forming precursor, an acid or base containing catalyst, water, and an alcohol containing solvent to form a reaction mixture by at least one of a hydrolysis and polycondensation reaction; and
   subsequently adding a solidifier to the reaction mixture;
   wherein the solidifier is added in an amount sufficient to expedite the sol-gel transition point without solidifying the sol when added to the sol-gel composition prior to application of the sol-gel composition to a substrate, and
   wherein the sol-gel composition comprises up to 0.1 wt. % of the solidifier in the total sol-gel composition.

2. The method of claim 1, wherein the solidifier is selected from the group comprising: gelatin, sodium acrylate, sodium acryloyldimethyl taurate, isohexadecane, polyoxyethylene (80) sorbitan monooleate, silica gel, polyethylene glycol (PEG) having a molecular mass between 200 and 1,000, low molecular mass organic gelators, charge neutralizers, cellulose derivatives, and combinations thereof.

3. The method of claim 2, wherein the solidifier is selected from the group comprising polyethylene glycol (PEG) having a molecular mass between 200 and 1,000 and hydroxypropylcellulose.

4. The method of claim 1, further comprising:
   adding a porosity forming agent to the reaction mixture.

5. The method of claim 4, wherein the porosity forming agent is selected from the group of self assembling molecular porogens comprising: polyoxyethylene stearyl ether, benzoalkoniumchloride (BAC), cetyltrimethylammoniumbromide (CTAB), 3-glycidoxypropyltrimethoxysilane, polyethyleneglycol (PEG), ammonium lauryl sulfate (ALS), dodecyltrimethylammoniumchloride (DTAC), polyalkyleneoxide modified hepta-methyltrisiloxane, and combinations thereof.

6. The method of claim 1, wherein the solidifier is present in the sol-gel system in an amount from 0.0001 to 0.1 wt. % of the total weight of the sol-gel composition.

7. The method of claim 1, wherein the film forming precursor is a silane containing precursor or silicon alkoxide containing precursor selected from the group comprising: tetraethylorthosilicate (TEOS), 3-glycidoxypropyltrimethoxysilane (Glymo), octadecyltrimethoxysilane (OTS), propyltriethoxysilane (PTES), (heptadecafluoro) ,1,2,2-tetrahydrodecyltrimethoxysilane, methyltriethoxysilane (MTES), hexamethyldisilazane (HMDS), and combinations thereof.

8. The method of claim 1, wherein the sol remains in low viscosity liquid phase after addition of the solidifier.

9. The method of claim 1, wherein the solidifier is polyoxyethylene (80) sorbitan monooleate.

10. The method of claim 1, wherein the sol-gel composition further comprises silica nanoparticles.

11. A composition for forming a sol-gel system, comprising:
    a film forming precursor;
    wherein the film forming precursor is a silicon containing precursor selected from the group comprising: tetraethylorthosilicate (TEOS), 3-glycidoxypropyltrimethoxysilane (Glymo), octadecyltrimethoxysilane (OTS), propyltriethoxysilane (PTES), (heptadecafluoro) 1,1,2,2-tetrahydrodecyltrimethoxysilane, hexamethyldisilazane (HMDS), methyltriethoxysilane (MTES), and combinations thereof;
    wherein the silicon containing precursor is present at a concentration between 1 wt. % and 10 wt. %;
    an acid or base containing catalyst present at a concentration between 0.001 wt. % and 0.1 wt. %;
    an alcohol containing solvent present at a concentration between 80 wt. % and 95 wt. %;
    a solidifier present at a concentration between 0.0001 wt. % and 0.1 wt. %; and
    water present at a concentration between 0.001 wt. % and 0.1 wt. %;
    wherein the solidifier is added in an amount sufficient to expedite the sol-gel transition point without solidifying the sol when added to the sol-gel composition prior to application of the sol-gel composition to a substrate, and
    wherein the sol-gel composition comprises up to 0.1 wt. % of the solidifier in the total sol-gel composition.

12. The composition of claim 11, wherein the solidifier is selected from the group comprising: gelatin, sodium acrylate, sodium acryloyldimethyl taurate, isohexadecane, polyoxyethylene (80) sorbitan monooleate, silica gel, polyethylene glycol (PEG) having a molecular mass between 200 and 1,000, low molecular mass organic gelators, charge neutralizers, cellulose derivatives, and combinations thereof.

13. The composition of claim 11, wherein the solidifier is selected from the group comprising polyethylene glycol (PEG) having a molecular mass between 200 and 1,000 and hydroxypropylcellulose.

14. The composition of claim 11, wherein the sol remains in low viscosity liquid phase after addition of the solidifier.

15. The composition of claim 11, wherein the solidifier is polyoxyethylene (80) sorbitan monooleate.

16. The composition of claim 11, further comprising silica nanoparticles.

* * * * *